June 14, 1966 P. H. BARTLETT 3,255,995
LANDING GEAR STRUCTURE
Filed April 6, 1964 2 Sheets-Sheet 1
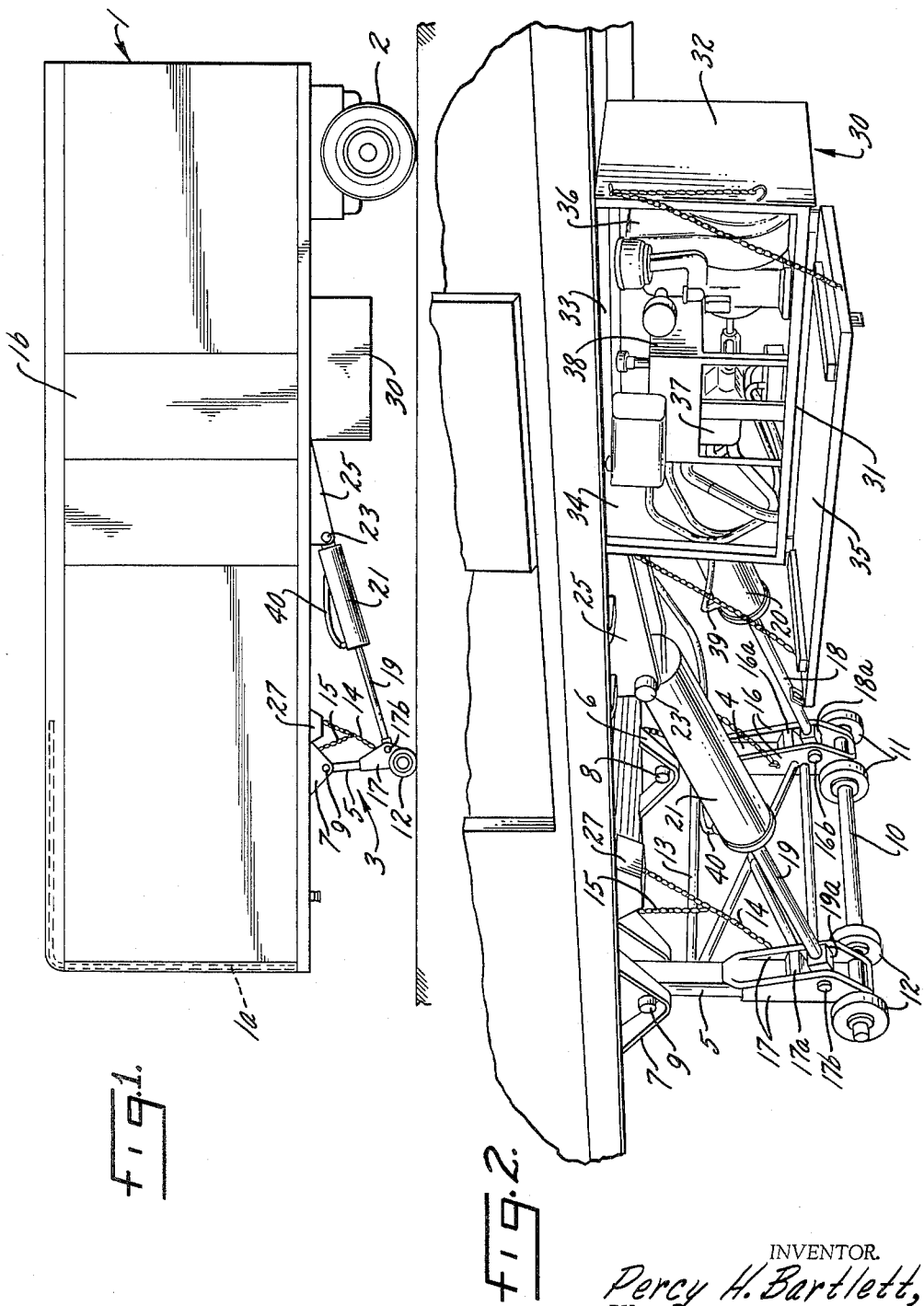
INVENTOR.
Percy H. Bartlett,
BY Parker & Carter
Attorneys.

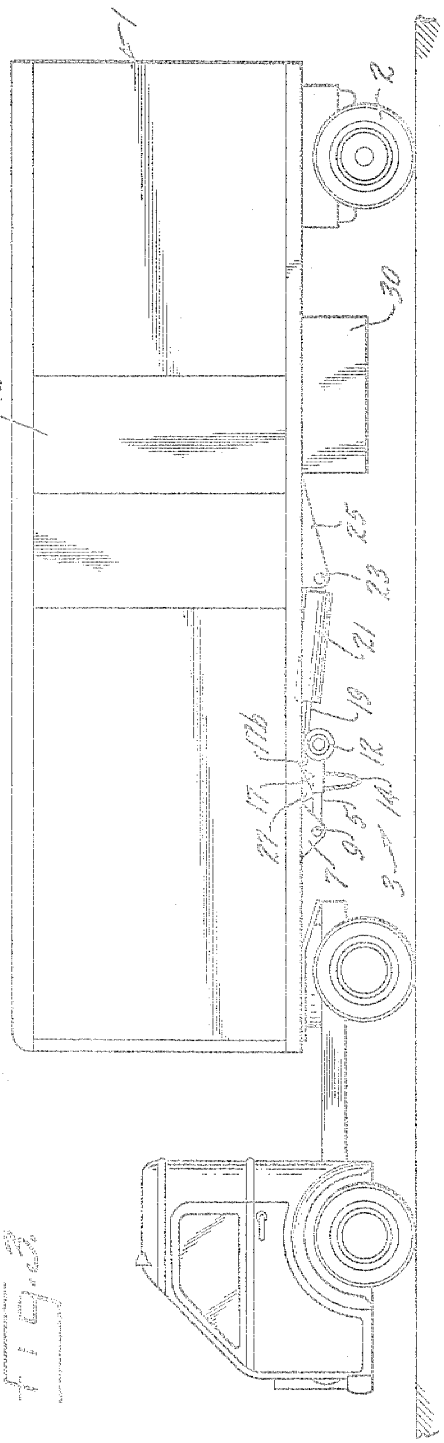
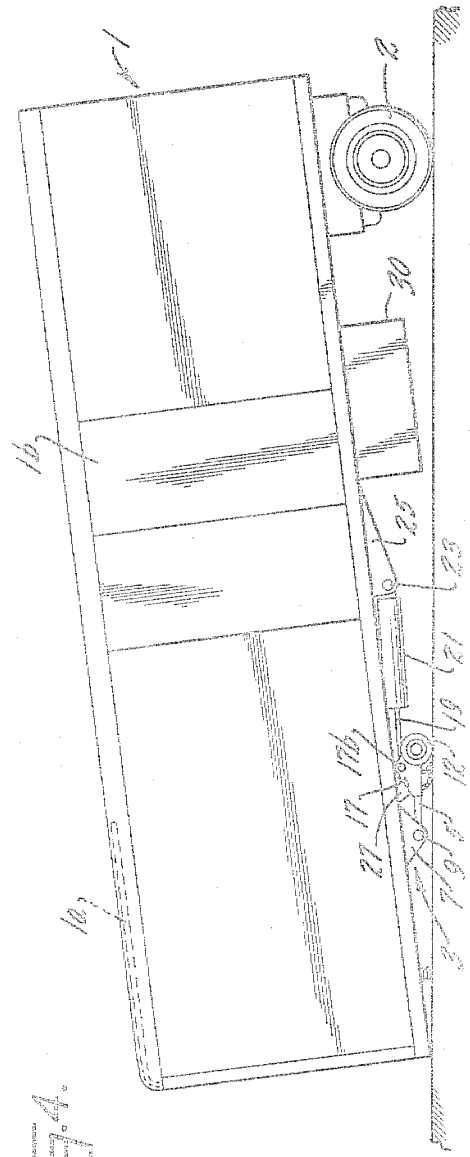

United States Patent Office 3,255,995
Patented June 14, 1966

3,255,995
LANDING GEAR STRUCTURE
Percy H. Bartlett, Riverside, Ill., assignor to Bartlett Trailer Corporation, Chicago, Ill., a corporation of Illinois
Filed Apr. 6, 1964, Ser. No. 357,486
1 Claim. (Cl. 254—86)

This invention relates to the field of vehicles and has particular relation to tractor-trailer vehicle combinations.

One purpose of the invention is to provide a landing gear structure for vehicle trailers.

Tractor-trailer combination vehicles have grown in numbers, size, weight and load capacity. The size and design of such vehicles have limited the areas of use thereof, however, normally requiring the provision of loading and off-loading docks or equipment and requiring the operator to back a trailer into position adjacent said docks. Many consignees, such as grocery stores and the like, cannot economically provide such docks and equipment. Accordingly, it is another purpose of the invention to provide a trailer-landing gear combination effective to expand and expedite the use of such trailer by any shipper or consignee having only a place to park the trailer.

Another purpose is to provide a landing gear structure movable into a plurality of positions to support a trailer and movable into a storage position.

Another purpose is to provide a trailer landing gear structure effective to permit loading of a trailer in an inclined position.

Another purpose is to provide a trailer landing gear structure effective to permit front loading of a trailer at ground level.

Another purpose is to provide a trailer-landing gear assembly effective to support the trailer in a plurality of inclined positions.

Another purpose is to provide a trailer landing gear structure formed of fixed-length rigid members.

Another purpose is to provide a landing gear structure effective to support a trailer in a horizontal plane.

Another purpose is to provide a trailer landing gear structure and means for positioning the same at a plurality of positions with respect to a trailer.

Other purposes will appear from time to time during the course of the specification and claims.

The invention is illustrated more or less diagrammatically in the accompanying drawings, wherein:

FIGURE 1 is a side elevation;

FIGURE 2 is a perspective view;

FIGURE 3 is a side elevation illustrating the trailer and landing gear of the structure in enroute configuration; and FIGURE 4 is a side elevation illustrating the trailer and landing gear structure of the invention in loading and off-loading configuration.

Like parts are indicated by like numerals throughout the specification and drawings.

Referring to the drawings, and particularly to FIGURE 1, the numeral 1 designates generally a trailer body. The trailer body illustrated has a forward access door 1a, which may be removable in its entirety, in the manner of the roll-up door shown in dotted lines, and a side access door 1b. It will be realized that a rear access door, as well as others, may be supplied without departing from the nature and scope of the invention and that the invention is applicable also to trailer bodies having no sidewalls or roofs.

The trailer body 1 has a support structure positioned beneath one end thereof, the support structure including a conventional set of wheels 2, for example. Positioned beneath the trailer body 1, adjacent the opposite end from the wheels 2, is a landing gear structure generally designated by the numeral 3.

The landing gear structure 3 includes a pair of rigid, fixed-length stanchions 4, 5. Each of the stanchions 4, 5 is pivotally mounted beneath the trailer 1 between an associated set of ears, the pair of spaced, depending ears supporting stanchion 4 being indicated at 6, and the corresponding set of ears pivotally carrying stanchion 5 is indicated at 7. The stanchions 4, 5 are pivoted on wrist pins 8, 9, respectively, extending between the ears of sets 6, 7.

An axle 10 is carried by and extends between the opposite ends of the stanchions 4, 5 and outwardly therebeyond. Rotatably supported on axle 10, on opposite sides of stanchion 4, is a pair of wheels indicated by the numeral 11. A similar set of wheels 12 is rotatably supported on opposite sides of the distal end of stanchion 5. A strengthening frame, indicated by the numeral 13, is secured to and extends between the stanchions 4, 5. Flexible elements, such as the chains 14, extend between intermediate portions of the stanchions 4, 5 and the undersurface of trailer body 1 and additional flexible elements, such as the chains 15, extend between an intermediate portion of each of the chains 14 and the undersurface of trailer body 1.

Each of the stanchions 4, 5 has a set of spaced, parallel plates extending rearwardly therefrom, the plates 16 extending rearwardly from stanchion 4 and the plates 17 extending rearwardly from stanchion 5. A cross beam member 16a extends between plates 16 and a similar cross beam member 17a extends between plates 17. Pins 16b, 17b extend, respectively, between plates 16 and 17 and rotatably support, respectively, the outer ends of a set of piston rods 18, 19. The opposite ends 18a, 19a of piston rods 18, 19 are secured, respectively, to pistons (not shown) slidably mounted in cylinders 20, 21. The internal structure of cylinders 20, 21 and the pistons therein are not shown, it being understood that any suitable, conventional hydraulic piston-cylinder structures may be employed without departing from the nature and scope of the invention. The closed ends of cylinders 20, 21 are pivotally supported beneath trailer body 1, respectively, on pins, such as pin 23. Said pins extend between and are carried by depending sets of plates or ears, such as the set shown at 25. A pair of abutment members, such as that shown at 27, depend from the undersurface of trailer body 1, respectively, intermediate the depending support sets of ears carrying legs 4, 5 and cylinders 20, 21.

A support platform 30 is carried beneath the undersurface of trailer body 1. The support structure 30 may take the form, for example, of a boxlike structure having a bottom wall 31 and a set of side walls 32, 33, 34, 35. Carried on bottom wall 31 is a power means 36 having a suitable driving connection with a hydraulic pump 37 and a hydraulic reservoir 38. Suitable conduit members are provided for association with the pump 37, and reservoir 38 and hydraulic cylinders 20, 21, the conduits 39, 40, for example, communicating with forward portions, respectively, of cylinders 20, 21. Wall 35 may be pivotally supported to bottom wall 31, as shown, for ready access to the assembly carried by wall 31. The particular details of the hydraulic power assembly including elements 36–40 will not be further discussed, it being understood that any suitable conventional hydraulic power assembly may be provided, including appropriate well-known valves and control elements and effective to produce forces of the order, for example, of 3000 p.s.i.

Whereas there has been shown and described an operative form of the invention, it should be understood that this showing and description are to be taken in an illustrative or diagrammatic sense only. There are many modifications in and to the invention which will be apparent to those skilled in the art and which will fall within the scop and spirit of the invention. The scope of the invention should, therefore, be limited only by the scope of the hereinafter appended claim.

The use and operation of the invention are as follows:

The landing year structure of the invention is positioned as shown in FIGURE 1 to support the trailer body 1 in the absence of a tractor. In such position, the stanchions 4, 5 are positioned to support the trailer body in substantially a horizontal plane. If stanchions 4, 5 were positioned vertically and free of all but the trailer weight, there would be a tendency to sway or rock. It has been found effective to preclude such sway by positioning the stanchions at a slight angle off the vertical, say 2 to 5 degrees rearwardly, and thus to maintain a force of pressure in cylinders 20, 21 against stanchions 4, 5. In such position the stanchions continue to support the weight of trailer body 1 and the forces in cylinders 20, 21 hold the entire assembly against sway or rock. When the operator desires to load or off-load the trailer body 1, suitable control valve elements of the hydraulic power mechanism carried by support 30 are activated to withdraw piston rods 18, 19 into cylinders 20, 21, respectively. As the rods 18, 19 are drawn into cylinders 20, 21 the ends 18a, 19a of rods 18, 19 rotate on pins 16b, 17b and cylinders 20, 21 rotate, respectively, on their supporting pins and stanchions 4, 5 are drawn rearwardly upwardly toward the undersurface of trailer body 1, thus lowering the end of trailer body 1 adjacent the landing gear structure 3. When the adjacent end, shown as the forward end of the trailer body 1 in the drawings, reaches the desired level for loading or off-loading, the operation of cylinders 20, 21 is stopped and the trailer body 1 may then be loaded or off-loaded. The landing gear assembly of the invention will support the trailer 1 at any desired position between those shown in FIGURES 1 and 4, as selected by the operator. As shown in FIGURE 4, for example, the forward end of trailer body 1 may be lowered to ground level and may, if desired, be directly supported on the ground during the loading and off-loading operation. As indicated above, trailer 1 may be supported in part or totally by the landing gear structure of the invention when the trailer is in a loading-off-loading inclined position.

It will be understood that suitable cargo-retaining elements may be employed to retain the cargo at a desired position in trailer 1 when the trailer is inclined. Similarly, the rear support structure 2 may be of the sliding type and may be selectively positioned with respect to trailer 1 between a travel position and a load-off load position, the wheels of structure 2 being then braked or blocked as desired.

When it is desired to raise the trailer body 1 from the position shown in FIGURE 4, for example, suitable valving in the assembly carried by support 30 is activated to cause outward movement of piston rods 18, 19 from associated cylinders 20, 21 to move stanchions 4, 5 downwardly and forwardly beneath the trailer body 1. As the stanchions 4, 5 are thus moved, wheel sets 11, 12 are brought into contact with the ground surface and continued outward movement of piston rods 18, 19 cause wheel sets 11, 12 to rotate along the ground and cause trailer body 1 to move upwardly toward the position shown, for example, in FIGURE 1. Similarly, as piston rods 18, 19 move outwardly, the outer ends 18a, 19a thereof rotate in pins 16b, 17b, respectively, and cylinders 20, 21 rotate on their supporting pins.

In the transport or fully-up position of the landing gear structure of the invention illustrated, for example, in FIGURE 3, the cylinders 20, 21 lie in a plane substantially paralleling that of the undersurface of trailer body 1, as do stanchions 4, 5, the abutment elements, such as that shown at 27, serving to limit and fix the upper position of the landing gear structure 3.

I claim:

A self-contained landing gear structure for raising and lowering one end of a trailer having supporting wheels at the opposite end, including:
- a first set of plates depending from said trailer body,
- a second set of plates depending from said trailer body and spaced thereon from said first set of plates,
- a pair of rigid, fixed length stanchions pivotally attached to said first set of plates adjacent the end of said trailer body opposite the supporting wheels and movable about said pivot between a generally vertical position and a generally horizontal position,
- ground engaging members attached to the free ends of said stanchions,
- a hydraulic cylinder and piston rod assembly having said cylinder pivotally attached to said second set of plates between the stanchions and the supporting wheels and having said piston rod attached to a stanchion adjacent a free end thereof with the piston rod being movable between fully extended and fully retracted positions relative to the cylinder,
- said piston rod and stanchion being connected to position the stanchions in said generally vertical position when the piston rod is fully extended from its cylinder and to position the stanchions in said generally horizontal position when the piston rod is fully retained into its cylinder, and
- a hydraulic power assembly mounted on said trailer and operatively connected to said cylinder and piston rod assembly to move said piston rod to and from said fully extended position against the load of the trailer to raise and lower the trailer, said stanchions, piston and cylinder being in a generally horizontal position when said trailer is in its traveling or ground-engaging position, said stanchions, piston and cylinder, when in said generally horizontal position, being substantially entirely located above the lowermost portion of said plates.

References Cited by the Examiner

UNITED STATES PATENTS

| | | | |
|---|---|---|---|
| 1,868,021 | 7/1932 | Nabors | 280—150.5 |
| 2,146,955 | 2/1939 | Helms et al. | |
| 2,165,538 | 7/1939 | Connors. | |
| 2,190,252 | 2/1940 | Brant et al. | 214—506 X |
| 2,304,622 | 12/1942 | Barrett. | |
| 2,400,652 | 5/1946 | Morris | 280—150.5 X |
| 2,431,245 | 11/1947 | Haig et al. | 254—86 X |
| 2,591,226 | 4/1952 | Askue | 214—506 X |
| 2,851,181 | 9/1958 | Thomann | 214—506 |
| 2,882,070 | 4/1959 | Bill | 280—475 |
| 3,169,012 | 2/1965 | Fagan | 280—150.5 X |

FOREIGN PATENTS 1,062,775   4/1954   France.

GERALD M. FORLENZA, *Primary Examiner.*

A. J. MAKAY, *Assistant Examiner.*